(12) United States Patent
Balistreri et al.

(10) Patent No.: US 11,859,708 B2
(45) Date of Patent: *Jan. 2, 2024

(54) SYSTEMS AND METHODS FOR PROVIDING ADJUSTABLE LUBRICATION TO A TANDEM AXLE

(71) Applicant: Dana Heavy Vehicle Systems Group, LLC, Maumee, OH (US)

(72) Inventors: Lucas A. Balistreri, Rudolph, OH (US); Shane T. Smith, Sylvania, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/160,931

(22) Filed: Jan. 27, 2023

(65) Prior Publication Data

US 2023/0175581 A1  Jun. 8, 2023

Related U.S. Application Data

(63) Continuation of application No. 16/914,070, filed on Jun. 26, 2020, now Pat. No. 11,598,409.

(51) Int. Cl.
| | | |
|---|---|---|
| *F16H 57/04* | (2010.01) | |
| *B60K 17/36* | (2006.01) | |
| *B60B 35/16* | (2006.01) | |
| *B60K 23/08* | (2006.01) | |

(52) U.S. Cl.
CPC ......... *F16H 57/0447* (2013.01); *B60B 35/16* (2013.01); *B60K 17/36* (2013.01); *B60K 23/08* (2013.01); *F16H 57/0434* (2013.01); *B60B 2900/561* (2013.01); *F16H 57/0483* (2013.01)

(58) Field of Classification Search
CPC ............. F16H 57/0447; F16H 57/0434; F16H 57/0483; B60B 35/16; B60B 2900/561; B60K 17/36; B60K 23/08
See application file for complete search history.

(56) References Cited

U.S. PATENT DOCUMENTS

| | | |
|---|---|---|
| 2,870,854 A | 1/1959 | Keese |
| 3,590,954 A | 7/1971 | Plantan |
| 3,887,037 A | 6/1975 | Haluda et al. |
| 5,161,644 A | 11/1992 | Swnskowski et al. |
| 5,404,963 A | 4/1995 | Crepas et al. |

(Continued)

FOREIGN PATENT DOCUMENTS

| | | | |
|---|---|---|---|
| DE | 3630973 A1 * | 3/1987 | |
| DE | 10308560 A1 * | 9/2004 | ......... F16H 57/0447 |
| EP | 2770229 A1 | 8/2014 | |

*Primary Examiner* — Justin Holmes
(74) *Attorney, Agent, or Firm* — McCoy Russell LLP

(57) ABSTRACT

Methods and systems are provided for adjusting a lubrication system based on an axle configuration of a tandem axle with a disconnect feature. In one example, a method may include adjusting an oil level in an axle sump of a tandem axle based on an axle configuration of the tandem axle (e.g., whether the tandem axle is operating with one of a 6×4 axle configuration and a 6×2 axle configuration), the axle sump selectably coupled to an external reservoir via a first passage and a second passage, the first passage including an electric pump, the second passage including a valve, and the tandem axle coupled to a drivetrain of a motor vehicle. In this way, an amount of oil in the axle sump may be adjusted based on the tandem axle configuration.

15 Claims, 7 Drawing Sheets

(56) References Cited

U.S. PATENT DOCUMENTS

| | | |
|---|---|---|
| 7,093,681 B2 | 8/2006 | Strain |
| 8,562,479 B2 | 10/2013 | Hamperl et al. |
| 8,911,321 B2 | 12/2014 | Ziech et al. |
| 9,103,433 B2 | 8/2015 | Kwasniewski et al. |
| 9,517,693 B2 | 12/2016 | Elliott |
| 9,816,603 B2 | 11/2017 | Hayes et al. |
| 10,190,673 B2 | 1/2019 | Creech et al. |
| 10,309,524 B2 | 6/2019 | Kiyokami et al. |
| 10,350,996 B2 | 7/2019 | Travvala et al. |
| 11,598,409 B2 * | 3/2023 | Balistreri .............. B60B 35/163 |
| 2010/0332089 A1 * | 12/2010 | Gianone ............. F16H 57/0447 |
| | | 701/51 |
| 2017/0120739 A1 | 5/2017 | Wagner et al. |
| 2018/0222317 A1 | 8/2018 | De Lemos |
| 2019/0128401 A1 | 5/2019 | Hayes et al. |
| 2019/0143973 A1 | 5/2019 | Tan |

* cited by examiner

SYSTEMS AND METHODS FOR PROVIDING ADJUSTABLE LUBRICATION TO A TANDEM AXLE

CROSS REFERENCE TO RELATED APPLICATION

The present application is a continuation of U.S. Non-Provisional patent application Ser. No. 16/914,070, entitled "SYSTEMS AND METHODS FOR PROVIDING ADJUSTABLE LUBRICATION TO A TANDEM AXLE", and filed on Jun. 26, 2020. The entire contents of the above-listed application are hereby incorporated by reference for all purposes.

FIELD

The present description relates generally to methods and systems for providing lubrication to a tandem axle.

BACKGROUND & SUMMARY

A variety of axle configurations may be provided to a motor vehicle, such as a heavy-duty motor vehicle for long-distance trucking operations. In a first example, a heavy-duty motor vehicle may have a 6×2 axle configuration. In such a configuration, one axle (e.g., two wheels) of a total of three axles (e.g., six wheels) is provided with torque from a drive shaft of the motor vehicle. In a second example, a heavy-duty motor vehicle may have a 6×4 axle configuration. In such a configuration, two axles (e.g., coupled to four wheels) of a total of three axles (e.g., coupled to six wheels) are provided with torque from the drive shaft of the motor vehicle. Each of the 6×2 axle configuration and the 6×4 axle configuration may provide advantages. For example, in a motor vehicle with the 6×2 axle configuration, fuel efficiency may be increased relative to a motor vehicle with the 6×4 axle configuration. However, due to the lower total number of wheels provided with torque, tractive power may be reduced in a motor vehicle with the 6×2 axle configuration, relative to a motor vehicle with the 6×4 configuration. For example, during some operating conditions, such as low-speed operation, the 6×4 axle configuration may be preferred, while in other operating conditions, the 6×2 axle configuration may be preferred. Thus, methods and systems for providing the benefits of both the 6×4 axle configuration and the 6×2 axle configuration are desired.

Therefore, some vehicle systems may include a tandem axle with a disconnect feature, so that a motor vehicle may be transitioned between the 6×4 axle configuration and the 6×2 axle configuration. For example, providing a vehicle with a tandem axle with a disconnect feature may enable increased vehicle efficiency at high speeds (e.g., during highway operation) by operating with the 6×2 axle configuration, and may provide increased tractive power during low-speed operation via the 6×4 axle configuration. However, less lubrication (e.g., engine oil) may be indicated while operating with the 6×2 axle configuration, relative to operating with the 6×4 axle configuration. For example, while operating with the 6×4 axle configuration, additional engine oil (e.g., a higher oil level in an axle sump of the tandem axle) may be indicated in order to decrease an incidence of component wear. In contrast, while operating with the 6×2 axle configuration, less engine oil (e.g., a lower oil level in the axle sump) may be indicated in order to increase the efficiency gains offered by 6×4 operation. In order to address these issues, some existing tandem axle systems provide an amount of oil intermediate between the ideal amount for the 6×4 axle configuration and the ideal amount for the 6×2 axle configuration, for example. However, this may reduce efficiency while operating with the 6×2 axle configuration, and may reduce durability while operating with the 6×4 axle configuration, which may lead to a decrease in customer satisfaction. As another example, some systems include a fully dry sump, and may provide a pump for transferring engine oil to an external reservoir while operating with the 6×4 axle configuration. However, the inventors herein have recognized potential issues with such systems. As one example, the pump may be parasitic with regard to power/torque from the drive shaft, and pump failure may result in low oil levels in the tandem axle, which may decrease tandem axle performance. For example, previous systems have lacked passive methods for increasing the oil level in the axle sump.

In one example, the issues described above may be addressed by a system for adjusting an oil level in an axle sump of a tandem axle based on an axle configuration of the tandem axle, the axle sump selectably coupled to an external reservoir via a first passage and a second passage, the first passage including an electric pump, the second passage including a valve, and the tandem axle coupled to a drivetrain of a motor vehicle.

As an example, while operating with a first axle configuration, the tandem axle may be configured so that the drive shaft of the engine provides torque to both of a first axle and a second axle, each of the first axle and the second axle coupled to at least wheels. Further, while operating with a second axle configuration, the tandem axle may be configured so that the drive shaft of the engine provides torque to the first axle and does not provide torque to the second axle. For example, when the tandem axle transitions from operating with the first axle configuration to operating with the second axle configuration, adjusting the oil level in the axle sump may include flowing oil from the axle sump to the external reservoir through the first oil passage by activating the electric pump and blocking flow through the second oil passage by closing the valve. Further, when the oil level in the axle sump is at or below a first threshold oil level while operating with the second axle configuration, oil flow may be blocked through the first oil passage by deactivating the electric pump. As another example, when the tandem axle transitions from operating with the second axle configuration to operating with the first axle configuration, adjusting the oil level in the axle sump may include flowing oil from the external reservoir to the axle sump through the second oil passage by opening the valve. Further, when the oil level in the axle sump is at or above a second threshold oil level while operating with the first axle configuration, oil flow may be blocked through the second oil passage by closing the valve. As an example, the second threshold oil level is higher than the first threshold oil level, and the second oil passage is a gravity feed.

In this way, a tandem axle with an adjustable lubrication system may operate with increased efficiency in the 6×2 axle configuration, while reducing an incidence of component wear in the 6×4 axle configuration. For example, by providing an adjustable lubrication system with an external oil reservoir, an electric pump, and a gravity feed selectably coupling the external reservoir to the axle sump, an oil level in the axle sump may be adjusted based on the selected axle configuration. Therefore, the oil level in the axle sump may be decreased in the 6×2 axle configuration in order to increase vehicle efficiency, and the oil level in the axle sump may be increased in the 6×4 axle configuration in order to provide additional lubrication and reduce component wear. For example, by including a gravity feed selectably coupling the external reservoir to the axle sump, additional lubrication may be provided to the axle sump without additional cost and complexity, and pump failure may not lead to component degradation due to low oil levels. Further, by pumping oil from the axle sump to the external reservoir in the 6×2 configuration via an electric pump, vehicle efficiency may be increased relative to systems that do not adjust the oil level for the 6×2 axle configuration, without including a parasitic pump, if desired. Overall, the vehicle may achieve the benefits of the 6×2 axle configuration at high speeds and the benefits of the 6×4 axle configuration at low speeds, which may increase customer satisfaction.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
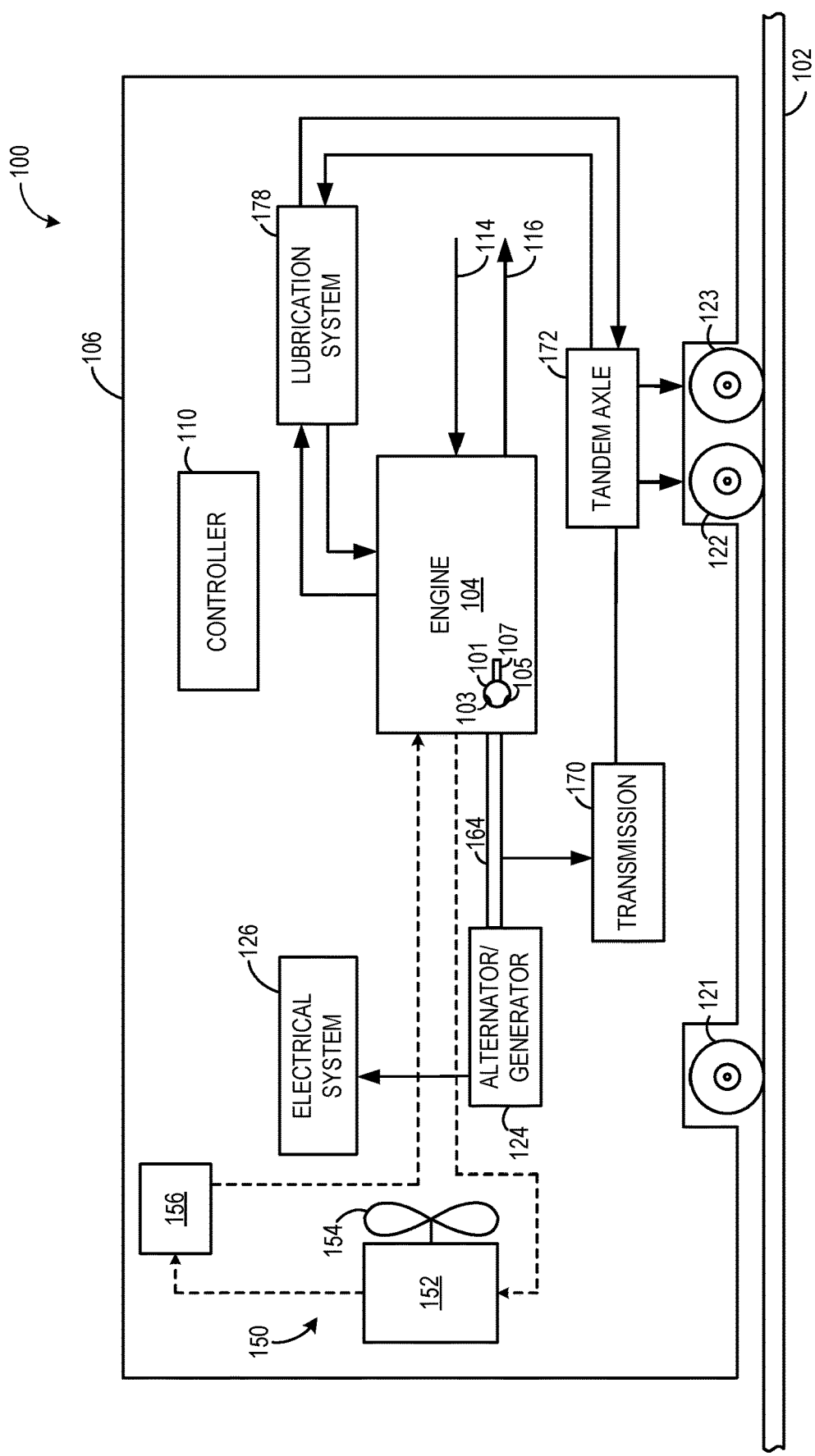
FIG. 1 shows a first example schematic view of a vehicle system including a tandem axle and a lubrication system.
Figure 2:
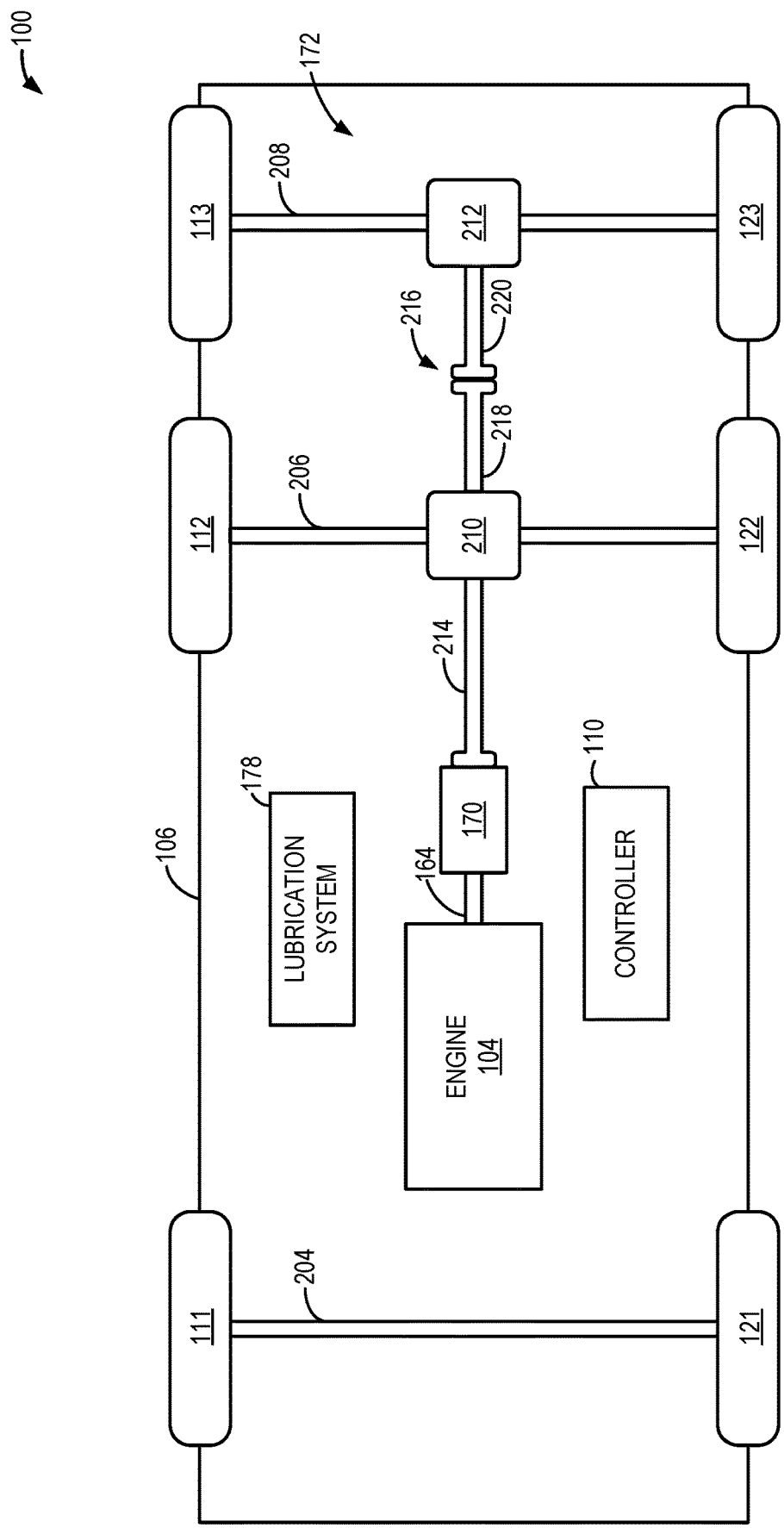
FIG. 2 shows a second example schematic view of the vehicle system of FIG. 1 including the tandem axle and the lubrication system.
Figure 3:
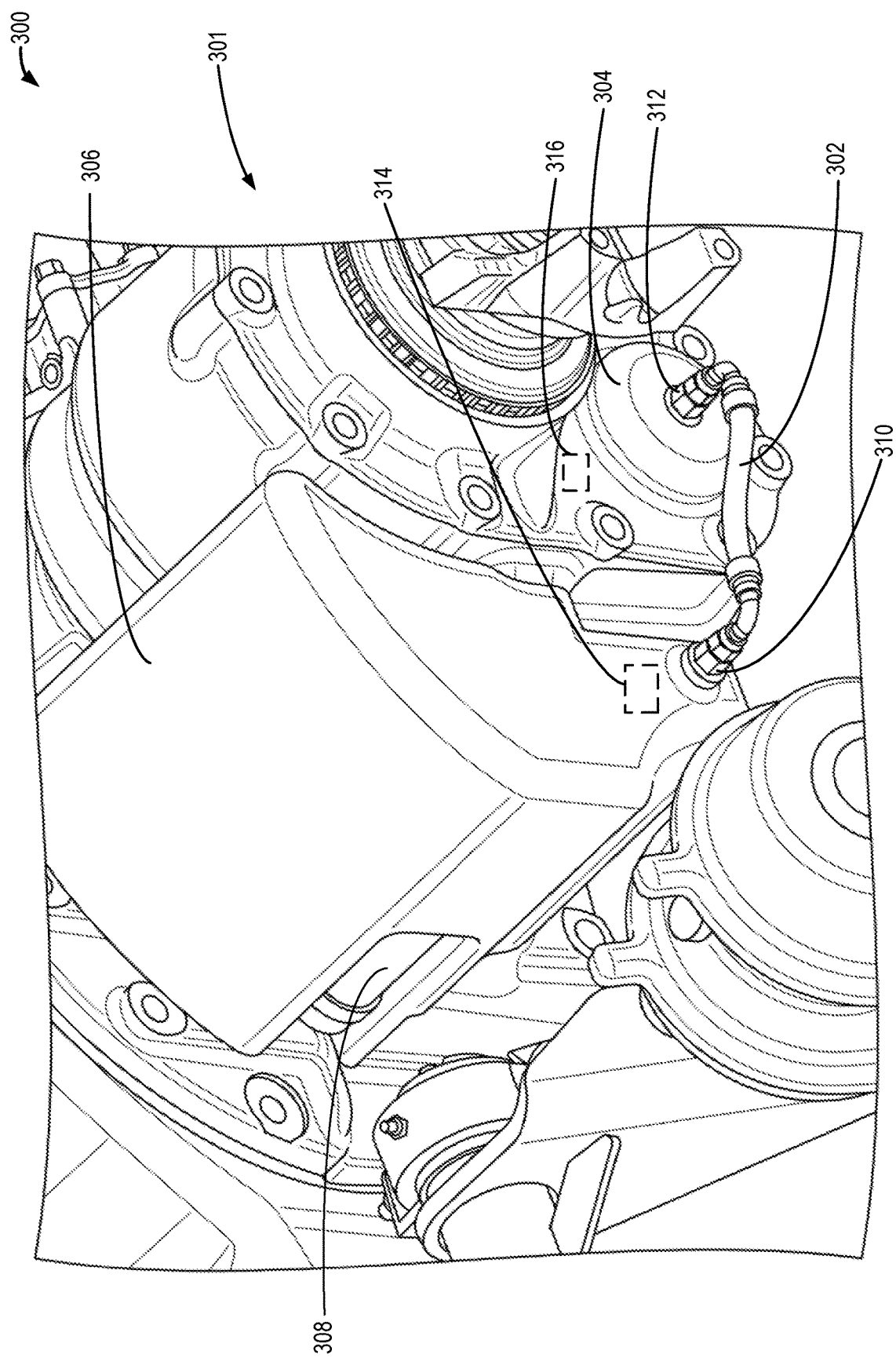
FIG. 3 shows an example detailed view of a lubrication system for a tandem axle with disconnect.
Figure 4A:
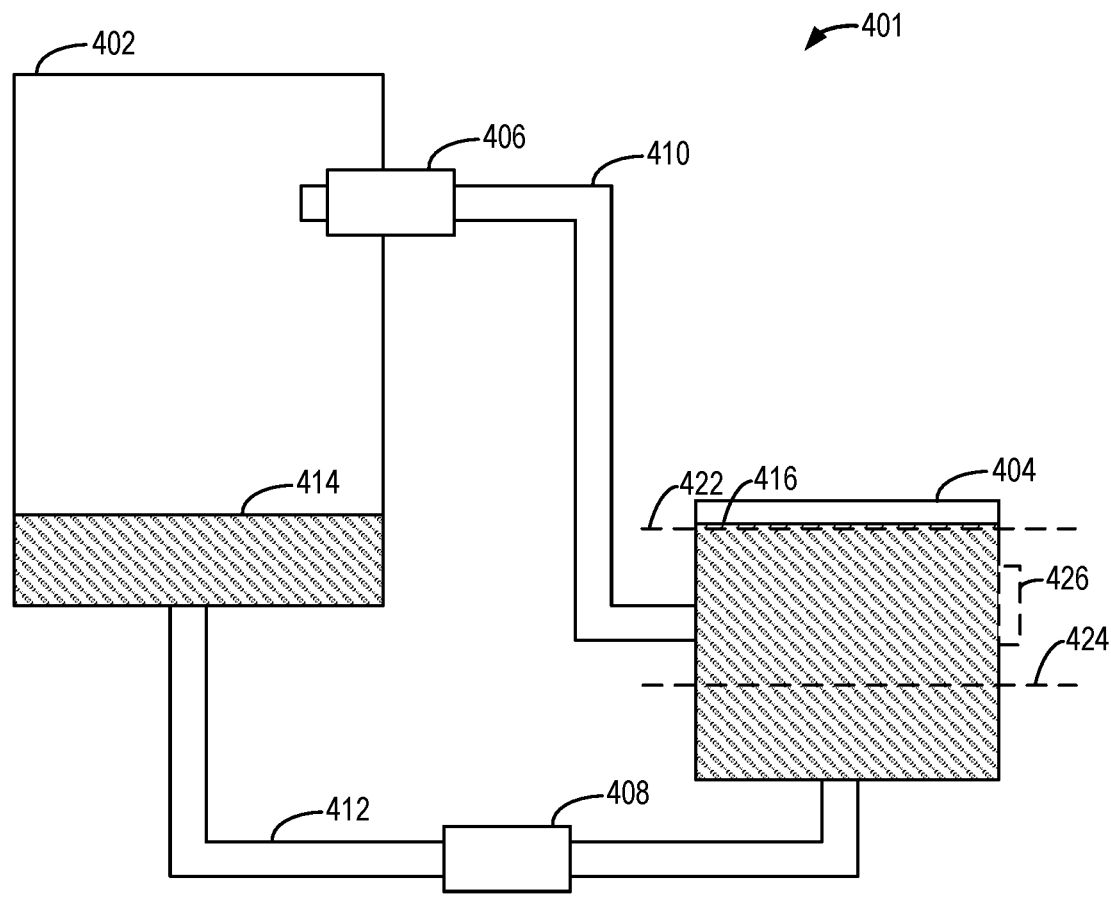
FIG. 4A shows an example schematic view of a lubrication system adjusted for a tandem axle with disconnect operating with a first tandem axle configuration.
Figure 4B:
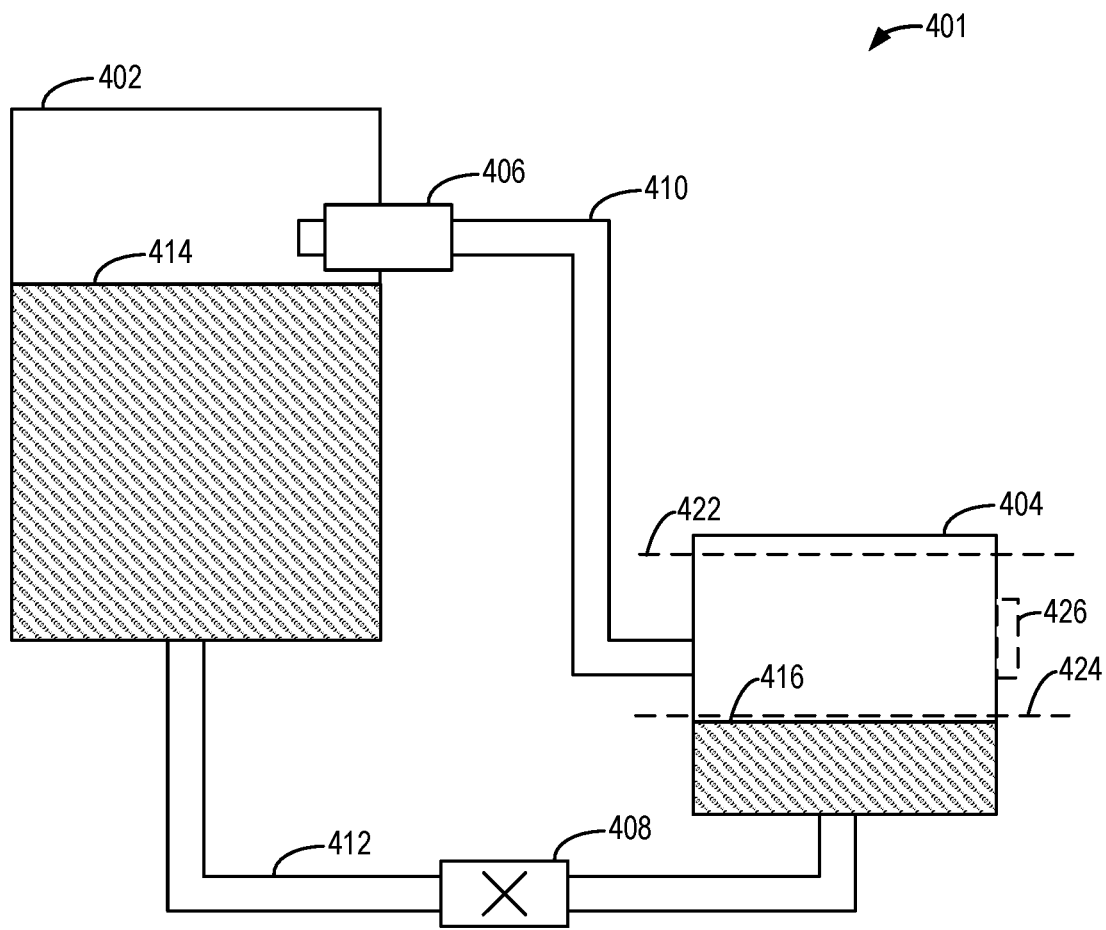
FIG. 4B shows an example schematic view of the lubrication system of FIG. 4A adjusted for the tandem axle with disconnect operating with a second tandem axle configuration.

The following description relates to methods and systems for providing adjustable lubrication to a tandem axle with disconnect functionality. For example, a vehicle system may include a tandem axle and a lubrication system, as shown in FIG. 1. In particular, the tandem axle may include a disconnect feature, so that the tandem axle may transition between operating in a first tandem axle configuration (e.g., a 6×4 axle configuration) and a second tandem axle configuration (e.g., a 6×2 axle configuration), as shown in FIG. 2. A lubrication system, such as shown in FIG. 3, may provide engine oil to an axle sump of the tandem axle in order to reduce component degradation and increase axle performance. However, based on the tandem axle configuration, a different amount of engine oil may be desired. As such, the amount of engine oil in the axle sump may be adjusted based on the tandem axle configuration. For example, while operating with the 6×4 axle configuration, more engine oil may be desired in the axle sump, as shown in FIG. 4A. Further, while operating with the 6×2 axle configuration, less engine oil may be desired in the axle sump, as shown in FIG. 4B. The amount of engine oil in the axle sump may be adjusted according to a method 500 shown in FIG. 5, and a prophetic example timeline for operating a motor vehicle with a tandem axle and a lubrication system for the tandem axle is shown in FIG. 6.

FIG. 3 is drawn approximately to scale. However, other relative dimensions may be used, in other embodiments.

Referring to FIG. 1, an embodiment of a system in which a tandem axle may be installed is shown. Specifically, FIG. 1 shows a block diagram of an embodiment of a vehicle system 100, herein depicted as a motor vehicle 106 (e.g., automobile), configured to run on a road 102 via a plurality of wheels, including wheel 121, wheel 122, and wheel 123. For example, motor vehicle 106 includes a total of six wheels, with half shown in the side view of FIG. 1. As an example, motor vehicle 106 may be a heavy-duty truck, such as may be employed for transporting goods across long distances. For example, motor vehicle 106 may include at least 3 axles, each axle connected to at least two wheels. As depicted, the motor vehicle 106 includes an engine 104. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine 104. In other non-limiting embodiments, the engine 104 may be used in medium duty vehicles, light duty vehicles, off-highway vehicles, and the like.

The engine 104 receives intake air for combustion from an intake passage 114. The intake passage 114 includes an air filter that filters air from outside of the motor vehicle. Exhaust gas resulting from combustion in the engine is supplied to an exhaust passage 116. Exhaust gas flows through the exhaust passage 116 and out of an exhaust system of the motor vehicle. Combustion in the cylinder drives rotation of a crankshaft 164. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, biodiesel, or other petroleum distillates of similar density through compression ignition and/or spark ignition.

As depicted in FIG. 1, the engine is coupled to an electric power generation system that includes an alternator/generator 124. For example, the engine is a diesel and/or natural gas engine that generates a torque output that is transmitted to the alternator/generator 124, which is mechanically coupled to the crankshaft 164, as well as to at least one of the plurality of wheels to provide motive power to propel the motor vehicle. The alternator/generator 124 produces electrical power that may be stored and applied for subsequent propagation to a variety of downstream electrical components. In one example, the alternator/generator 124 may be coupled to an electrical system 126. The electrical system 126 may include one or more electrical loads configured to run on electricity generated by the alternator/generator 124, such as vehicle headlights, a cabin ventilation system, and an entertainment system, and may further include an energy storage device (e.g., a battery) configured to be charged by electricity generated by the alternator/generator 124. In some examples, the vehicle may be a diesel electric vehicle, and the alternator/generator 124 may provide electricity to one or more electric motors to drive the wheels (e.g., including wheel 121, wheel 122, and wheel 123).

For example, when a clutch is engaged, the crankshaft 164 is mechanically coupled to a transmission 170. Transmission 170 may be a gearbox, a planetary gear system, or another type of transmission. The powertrain may be configured in various manners including as a parallel, a series, or a series parallel hybrid vehicle. Further, transmission 170 may be coupled to a tandem axle 172, which may provide motive power to the plurality of wheels. For example, the tandem axle may comprise two axles (e.g., a first axle and a second axle), each axle coupled to at least two of the plurality of wheels, for converting torque from the transmission 170 to rotational motion. Further, as will be elaborated with respect to FIG. 2, tandem axle 172 includes a disconnect feature, so that the tandem axle may transition between operating with a 6×2 axle configuration and a 6×4 axle configuration. For example, while operating with the 6×2 axle configuration, only the first axle may be provided with torque. While operating with the 6×4 axle configuration, both of the first axle and the second axle may be provided with torque. As an example, operating with the 6×2 axle configuration may increase vehicle efficiency at high vehicle speeds, but may lead to a decrease in traction, as only two of the six wheels 112 are provided with torque. As another example, operating with the 6×4 axle configuration may increase traction, as four of the six wheels are provided with torque. However, operating with the 6×4 axle configuration may be decrease fuel efficiency, relative to operating with the 6×2 axle configuration. In order to transition between operating with the 6×4 axle configuration and the 6×2 axle configuration, the controller 110 may transmit a signal to the tandem axle causing the tandem axle to activate the disconnect feature.

In some embodiments, the vehicle system may further include an aftertreatment system coupled in the exhaust passage 116. In one embodiment, the aftertreatment system may include one or more emission control devices. Such emission control devices may include a selective catalytic reduction (SCR) catalyst, a three-way catalyst, a $NO_x$ trap, or various other devices or exhaust aftertreatment systems. In another embodiment, the aftertreatment system may additionally or alternatively include a diesel oxidation catalyst (DOC) and a diesel particulate filter (DPF).

As depicted in FIG. 1, the vehicle system further includes a cooling system 150 (e.g., an engine cooling system). The cooling system 150 circulates coolant through the engine 104 to absorb waste engine heat and distribute the heated coolant to a heat exchanger, such as a radiator 152 (e.g., a radiator heat exchanger). In one example, the coolant may be water or antifreeze. In another example, the coolant may be a mixture of water and antifreeze. A fan 154 may be coupled to the radiator 152 in order to maintain an airflow through the radiator 152 when the vehicle is moving slowly or stopped while the engine 104 is running. In some examples, fan speed may be controlled by the controller 110. Coolant that is cooled by the radiator 152 may enter a tank (not shown). The coolant may then be pumped by a water, or coolant, pump 156 back to the engine or to another component of the vehicle system. Coolant may be pumped via a series of water lines, such that one or more water lines fluidically couples the radiator to the pump, one or more water lines fluidically couples the pump to the engine, and one or more water lines fluidically couples the engine 104 to the radiator. In some examples, the water lines may be fabricated from a flexible material, such as polyurethane or rubber, for example. In other examples, the water lines may be fabricated from an inflexible material, such as copper or steel.

Further, as depicted in FIG. 1, the vehicle system includes a lubrication system 178 for delivering a lubricant, such as engine oil, to various parts of the engine system. For example, as shown, lubrication system 178 routes oil to the engine 104, where it may circulate through various components in order to reduce component wear. The oil may be routed to the engine via a pump, in some examples. In other examples, the oil may be routed to the engine via a gravity feed system. After circulating through the engine, oil may drain back to the lubrication system and recirculated. For example, after circulating through the engine, oil may pass through an oil filter in order to remove debris and other contaminants. In some examples, lubrication system 178 may include a means for cooling the oil before recirculated. Further, as shown in FIG. 1, the lubrication system 178 routes lubricating oil to the tandem axle 172, described above. In some examples, the tandem axle 172 may include an adjustable lubrication system for controlling oil distribution in the tandem axle. For example, the adjustable lubrication system of tandem axle 172 may include an axle sump and an external reservoir, as elaborated below with respect to FIG. 3. In some examples, lubrication system 178 and may periodically drain and recirculate oil to the tandem axle, in order to maintain a desirable level of oil quality. In some examples, lubrication system 178 may route oil to additional engine components not shown in FIG. 1.

The controller 110 may be configured to control various components related to the motor vehicle. For example, controller 110 may be a microcomputer, including a microprocessor unit, input/output ports, an electronic storage medium for executable programs (e.g., executable instructions) and calibration values stored in non-transitory read-only memory. As an example, various components of the vehicle system may be coupled to the controller 110 via a communication channel or data bus. In one example, the controller 110 includes a computer control system. Controller 110 may receive various signals from sensors of the vehicle system. In some examples, the controller 110 may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller 110 may receive signals from various engine sensors including, but not limited to, measurements of engine speed, engine load, intake manifold air pressure, boost pressure, exhaust pressure, ambient pressure, ambient temperature, exhaust temperature, particulate filter temperature, particulate filter back pressure, engine coolant pressure, or the like.

Additional sensors, such as coolant temperature sensors, may be positioned in the cooling system. Correspondingly, the controller 110 may control the engine and/or the vehicle by sending commands to various components such as the alternator/generator 124, fuel injectors 107, valves, coolant pump 156, or the like. For example, the controller 110 may control the operation of a restrictive element (e.g., such as a valve) in the engine cooling system. Other actuators may be coupled to various locations in the vehicle.

Turning now to FIG. 2, another view of vehicle system 100 is shown, including tandem axle 172 with the disconnect feature. Components shown in FIG. 2 may be substantially identical to components shown in FIG. 1, and as such, like components may be numbered the same and not reintroduced. As shown, each of the six wheels, wheel 111, wheel 112, wheel 113, wheel 121, wheel 122, and wheel 123, is coupled to an axle. Two wheels (e.g., wheel 111 and wheel 121) are coupled to a front axle 204. For example, the front axle may not be provided with torque, and may be a steering axle. For example, the front axle may be coupled to a steering system (not shown) for changing a direction of the vehicle 106. Further, tandem axle 172 includes a driveshaft 214, a first axle 206, a second axle 208, and a disconnect joint 216. The first axle 206 is coupled to wheel 112 and wheel 122, and the second axle 208 is coupled to wheel 113 and wheel 123. Further, the first axle 206 may include a first differential 210, and the second axle 208 may include a second differential 212. As shown, engine 104 is coupled to transmission 170 via crankshaft 164, which may transfer torque to driveshaft 214. For example, transmission 170 may include gears for adjusting an amount of torque provided to the driveshaft. For example, each of the first differential 210 and the second differential 212 is configured to transfer rotational energy to the drive wheel via axle shafts. To accomplish the aforementioned rotational energy transfer functionality, each of the first differential 210 and the second differential 212 may include gears (e.g., ring gear, bevel gear, planetary gears, etc.), a housing, and the like. To elaborate, the differential may be a locking, non-locking, or limited slip-type differential, for instance. Additionally, in one example, the axles (e.g., the first axle 206, the second axle 208, and the front axle 204) may be beam axles. However, independent suspension designs have also been envisioned.

Further, the disconnect joint 216 may selectably couple a first connection shaft 218 to a second connection shaft 220. For example, while operating with the 6×4 axle configuration, the disconnect joint 216 may mechanically couple the first connection shaft 218 to the second connection shaft 220, so that torque is provided to both of the first axle 206 and the second axle 208. However, while operating with the 6×2 axle configuration, the disconnect joint 216 may disconnect the first axle 206 from the second axle 208, so that torque is provided to the first axle 206, but not to the second axle 208. Providing torque to an axle includes providing motive force to wheels coupled to the axle. For example, while operating with the 6×4 axle configuration, four wheels (e.g., wheel 112, wheel 122, wheel 113, and wheel 123) may be provided with motive force, and while operating with the 6×2 axle configuration, two wheels (e.g., wheel 112 and wheel 122) may be provided with motive force. The state of the disconnect joint 216 (e.g., connected or disconnected) may be adjusted in response to a signal from controller 110. For example, controller 110 may determine that operating with the 6×4 axle configuration is indicated when a vehicle speed is below a threshold vehicle speed, and may send a control signal to disconnect joint 216 to connect the first connection shaft 218 to the second connection shaft 220, so that both of the first axle 206 and the second axle 208 are provided with torque. As another example, controller 110 may determine that operating with the 6×2 axle configuration is indicated, such as when the vehicle speed exceeds the threshold vehicle speed, and may send a control signal to disconnect joint 216 to disconnect the first connection shaft 218 from the second connection shaft 220, so that the first axle 206 is provided with torque and the second axle 208 is not provided with torque.

In some examples, the tandem axle system may transition between the 6×4 axle configuration and the 6×2 axle configuration in response to a user input. For example, a push button may be included in a vehicle cabin, and the controller may transition the tandem axle between the 6×4 axle configuration in response to a signal from the push button. As an example, during inclement weather (e.g., such as icy road conditions), the 6×4 axle configuration may be desired although the vehicle speed is above the threshold vehicle speed. Thus, the user may depress the push button, or another user input, in order to transition the tandem axle to the 6×4 axle configuration.

In some examples, a tandem axle system may be configured so that the second axle 208 is provided with torque while operating with the 6×2 axle configuration, rather than the first axle 206. In such an embodiment, while operating with the 6×2 axle configuration, the disconnect joint 216 may couple the second axle 208 to the powertrain (e.g., to power from the drive shaft), while disconnecting the first axle 206 from the powertrain, so that wheel 113 and wheel 123 are provided with motive power, while wheel 112 and wheel 122 are not provided with motive power.

Including a tandem axle system with a disconnect feature, such as the tandem axle 172 shown in FIGS. 1 and 2, may enable the vehicle to employ (e.g., operate with) the 6×2 axle configuration in some operating conditions, and to employ the 6×4 axle configuration in other operating conditions. For example, the tandem axle may transition between operating with the 6×2 axle configuration and the 6×4 axle configuration in order to increase the efficiency of the vehicle during high-speed operating condition while providing additional traction in low-speed operating conditions or inclement weather. Therefore, including a tandem axle with a disconnect feature in a vehicle may increase customer satisfaction, vehicle efficiency, and overall vehicle performance. However, an amount of lubrication provided to the tandem axle while operating with the 6×4 axle configuration may not be suitable for efficient operation with the 6×2 axle configuration, and the amount of lubrication provided to the tandem axle while operating with the 6×2 axle configuration may not be suitable for reducing component degradation while operating with the 6×4 axle configuration. For example, the tandem axle may include an axle sump, and a higher oil level in the axle sump may be indicated while operating with the 6×4 axle configuration, relative to the 6×2 axle configuration. As an example, vehicle efficiency with the 6×2 axle configuration may be decreased while the oil level in the axle sump is high. As another example, an incidence of component degradation may be increased with the 6×4 axle configuration while the oil level is low.

Therefore, an adjustable lubrication system is included in a tandem axle with a disconnect feature, according to an embodiment of the present disclosure. Specifically, the adjustable lubrication system may enable an amount of lubrication in the axle sump and the external reservoir may be adjusted based on an axle configuration of the tandem axle (e.g., one of the 6×4 axle configuration and the 6×2 axle configuration), as will be described below with respect to FIGS. 4A and 4B. For example, the adjustable lubrication system includes an axle sump, an electric pump, an external reservoir for engine oil, and a gravity feed selectably coupling the external reservoir to an axle sump, the gravity feed controlled by a valve.

Therefore, FIG. 3 shows a partial view 300 of an adjustable lubrication system 301 for a tandem axle of a vehicle. FIG. 3 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 3 shows components of adjustable lubrication system 301, which may provide lubrication (e.g., such as engine oil) to engine components. For example, adjustable lubrication system 301 may be fluidically coupled to a main lubrication system of an engine, such as lubrication system 178 described with respect to FIGS. 1 and 2, and may provide lubrication to a tandem axle system, such as tandem axle 172 described with respect to FIGS. 1 and 2. For example, the engine lubrication system may flow oil to the adjustable lubrication system 301, and the adjustable lubrication system 301 may ensure circulation of oil in the tandem axle, based on the selected axle configuration. In particular, adjustable lubrication system 301 includes an electric pump 308 for pumping engine oil to an axle sump 304 of the tandem axle system through a first oil passage (not shown). The axle sump 304 may directly provide oil to components of the tandem axle. The electric pump 308 may be driven by an electrical system of the vehicle (e.g., such as electrical system 126 of FIG. 1) and may include an electric motor, housing, chambers, pistons, seals, etc. to achieve oil flow adjustment functionality. Further, adjustable lubrication system 301 includes an external reservoir 306 for storing engine oil. The external reservoir 306 may be a sealed reservoir for storing additional oil, so that the oil level in the axle sump 304 may be increased when indicated. For example, external reservoir 306 is selectably fluidically coupled to the axle sump 304 via a second oil passage 302. The oil passage 302 may be coupled to the external reservoir 306 via a first attachment joint 310, and the second oil passage 302 may be coupled to the axle sump 304 via a second attachment joint 312. For example, the second oil passage 302 is a gravity feed, and includes a solenoid valve (not shown in FIG. 3). When the solenoid valve is in an open position, the drain line may allow oil to flow from the external reservoir to the axle sump, and when the solenoid valve is in a closed position, the drain line may not allow oil to flow from the external reservoir to the axle sump. For example, a position of the solenoid valve may be controlled by a controller, such as controller 110 of FIGS. 1 and 2. The output of the electric pump 308 may also be controlled via a controller such as the controller 110 of FIGS. 1 and 2. Axle sump 304 may provide lubrication to components of the tandem axle via splash lubrication, for example.

Further, adjustable lubrication system 301 may be adjusted based on a configuration of the tandem axle. For example, the tandem axle may include a disconnect feature (e.g., such as the tandem axle 172 with disconnect functionality described with respect to FIGS. 1 and 2), and may transition between operating with two powered axles (e.g., the 6×4 axle configuration) and one powered axle (e.g., the 6×2 axle configuration). As an example, while with the 6×2 axle configuration, the tandem axle may provide torque to one axle. As another example, while operating with the 6×4 axle configuration, the tandem axle may provide torque to two axles. For example, a controller (e.g., such as controller 110 described with respect to FIGS. 1 and 2) may control the tandem axle to transition between the 6×2 axle configuration and the 6×4 axle configuration based on one or more engine operating conditions, such as vehicle speed. Specifically, the 6×2 axle configuration may be indicated when the vehicle speed exceeds a threshold vehicle speed, and the 6×4 axle configuration may be indicated when the vehicle speed is at or below a threshold vehicle speed. Further, in some examples, other parameters may be used in addition to or as an alternative to vehicle speed, in order to determine whether the 6×2 axle configuration or the 6×4 axle configuration is indicated. As one example, the additional tractive power of the 6×4 axle configuration may be indicated when inclement weather (e.g., icy and/or wet road conditions) is detected. As another example, a vehicle user may input a command to transition between the 6×4 axle configuration and the 6×2 axle configuration via an input device (e.g., push button, touch screen, lever, etc.).

In some examples, an oil level in the axle sump 304 may be monitored by at least one level sensor, such as a level sensor 314. For example, level sensor 314 is optionally coupled to the axle sump 304, and may transmit a signal corresponding to an oil level in the axle sump to a controller, such as controller 110 of FIG. 1. For example, by monitoring the oil level in the axle sump 304, the oil level may be more accurately controlled. Further, in some examples, a level sensor 316 is optionally included in the external reservoir 306. In other examples, a level sensor may not be included in the axle sump, and the controller may estimate an oil level in the axle sump based on oil temperature, oil age, a road grade, pump operation, and a valve position. For example, the controller may estimate an oil viscosity based on oil temperature and oil age, may estimate an oil pressure based on the road grade (e.g., the grade of the road during vehicle operation). Using the estimated oil viscosity and oil pressure, the controller may estimate an oil flow rate based on pump operation and the valve position. In some examples, the controller may estimate the axle sump level based in part on a pump operating time and/or an amount of open time for the valve.

Next, FIGS. 4A and 4B show components an adjustable lubrication system 401 for a tandem axle during vehicle operation. For example, adjustable lubrication system 401 may be used as adjustable lubrication system 301 of FIG. 3. As elaborated above, it may be advantageous to adjust an amount of lubricant (e.g., oil) in an axle sump of a tandem axle based on the selected axle configuration (e.g., one of the 6×4 axle configuration and the 6×2 axle configuration. Specifically, less oil in the axle sump (e.g., a lower oil level in the axle sump) may be desired while operating with the 6×2 axle configuration, and more oil in the axle sump (e.g., a higher oil level in the axle sump) may be desired while operating with the 6×4 axle configuration. Adjustable lubrication system 401 is shown identically in FIGS. 4A and 4B, with the exception of a distribution of oil. As shown in FIGS. 4A and 4B, adjustable lubrication system 401 includes an axle sump 404 for lubricating the tandem axle, and an external reservoir 402 for storing additional oil. Further, the external reservoir 402 is coupled to the axle sump 404 by a first oil passage 410 and a second oil passage 412. The first oil passage 410 includes an electric pump 406 that, when activated, may pump oil from the axle sump 404 to the external reservoir 402. Specifically, when the electric pump 406 is activated, oil may be pumped from the axle sump 404 to the external reservoir 402. The second oil passage 412 includes a valve 408, the position of the valve controlled by a solenoid. For example, when the valve is in an open position, oil may drain from the external reservoir 402 to the axle sump 404 through second oil passage 412. Further, when the valve is in a closed position, oil may not drain from the external reservoir 402 to the axle sump 404 through the second oil passage 412. Specifically, second oil passage 412 may be a gravity feed, and oil may drain from the external reservoir 402 to the axle sump 404 via gravitational force when the valve 408 is in the open position. The position of the valve is controlled by an electronically actuated solenoid. For example, a controller, such as controller 110 of FIGS. 1 and 2, may send a control signal to the solenoid in order to adjust the position of the valve 408.

For example, the first oil passage 410 couples the axle sump 404 to the external reservoir 402 when the electric pump 406 is activated. Said differently, activating electric pump 406 causes oil to flow from the axle sump 404 to the external reservoir. Further, the second oil passage 412 couples the axle sump 404 to the external reservoir 402 when the valve 408 is in the open position. For example, opening valve 408 causes oil to flow from the external reservoir to the axle sump. As such, a flow of oil in to and out of the axle sump 404 may be controlled by adjusting a status of electric pump 406 (e.g., whether the electric pump is activated or deactivated) and the position of valve 408 (e.g., open or closed). By adjusting the flow of oil into and out of the axle sump, an axle sump level 416 (e.g., a volume of oil in the axle sump) may be controlled. In some examples, a level sensor 426 may optionally be coupled to axle sump 404 in order to monitor axle sump level 416. For example, level sensor 426 may be communicatively coupled to a controller of the vehicle.

FIG. 4A shows the adjustable lubrication system 401 while the tandem axle operates with the 6×4 axle configuration. As elaborated above, a higher oil level in the axle sump is indicated while operating with the 6×4 axle configuration, relative to operating with the 6×2 axle configuration. For example, when the tandem axle operates with the 6×4 axle configuration, the electric pump 406 is not activated (e.g., oil is not pumped out of axle sump 404 into external reservoir 402), and the valve 408 is in the open position, so that oil flows from the external reservoir 402 to the axle sump 404. Therefore, as shown, an external reservoir level 414 is low, while the axle sump level 416 is high. For example, maintaining a high axle sump level 416 while operating with the 6×4 axle configuration may increase durability of the tandem axle. Further, after the axle sump level 416 is at or above a first threshold level 422, the valve 408 may be closed in order to maintain the axle sump level 416 just above the first threshold level 422. In one example, the first threshold level 422 may be a pre-determined axle sump level for operating with the 6×4 axle configuration. In another example, the first threshold level 422 may be determined based on vehicle operating conditions, such as oil temperature, road grade, engine speed, and the like. As an example, when the oil level in the axle sump 404 reaches the first threshold oil level 422, the solenoid may actuate in order to close valve 408, so that no additional oil flows into the axle sump 404. As one example, a controller may determine to close valve 408 based on a signal from level sensor 426 corresponding to axle sump level 416 at or above the first threshold level 422.

FIG. 4B shows the adjustable lubrication system 401 while the tandem axle operates with the 6×2 axle configuration. For example, when the tandem axle operates with the 6×2 axle configuration, the electric pump 406 is activated so that oil is pumped from the axle sump 404 to the external reservoir 402. Further, valve 408 is in the closed position, so that oil does not drain from the external reservoir 402 to the axle sump 404. Therefore, the axle sump level 416 while operating with the 6×2 axle configuration decreases relative to the axle sump level while operating with the 6×4 axle configuration (e.g., as shown in FIG. 4A), and the external reservoir level 414 while operating with the 6×2 axle configuration increases relative to the external reservoir level while operating with the 6×4 axle configuration (e.g., as shown in FIG. 4A). Specifically, the electric pump 406 may remain activated until the axle sump level 416 is at or below a second threshold level 424. For example, the second threshold level 424 may be a pre-determined axle sump level for operating with the 6×2 axle configuration. As another example, the second threshold level 424 may be determined based on engine operating conditions, or may be adjusted based on an adjustment to the first threshold level 422. Further, the second threshold level 424 may be less than the first threshold level 422. After the oil level in the axle sump 404 is at or below the second threshold level, the electric pump 406 may turn off, and the valve 408 may remain closed, in order to maintain the oil level in the axle sump. For example, a controller may determine to deactivate electric pump 406 based on a signal from level sensor 426 corresponding to an axle sump level 416 at or below the second threshold level 424.

In another embodiment, adjustable lubrication system 401 may include a continuous gravity feed system, so that oil continuously flows into the axle sump 404, and the electric pump 406 periodically pumps a portion of oil out of the axle sump in order to maintain the axle sump level at the desired level. For example, such a system may not include a valve 408, and electric pump 406 may periodically be activated in order to maintain the oil level in the axle sump at the desired level based on the axle configuration. Further, in some examples, adjustable lubrication system 401 may include a valve that continuously feeds oil back to the axle sump during vehicle operation in order to refresh the oil in the axle sump.

Figure 5:
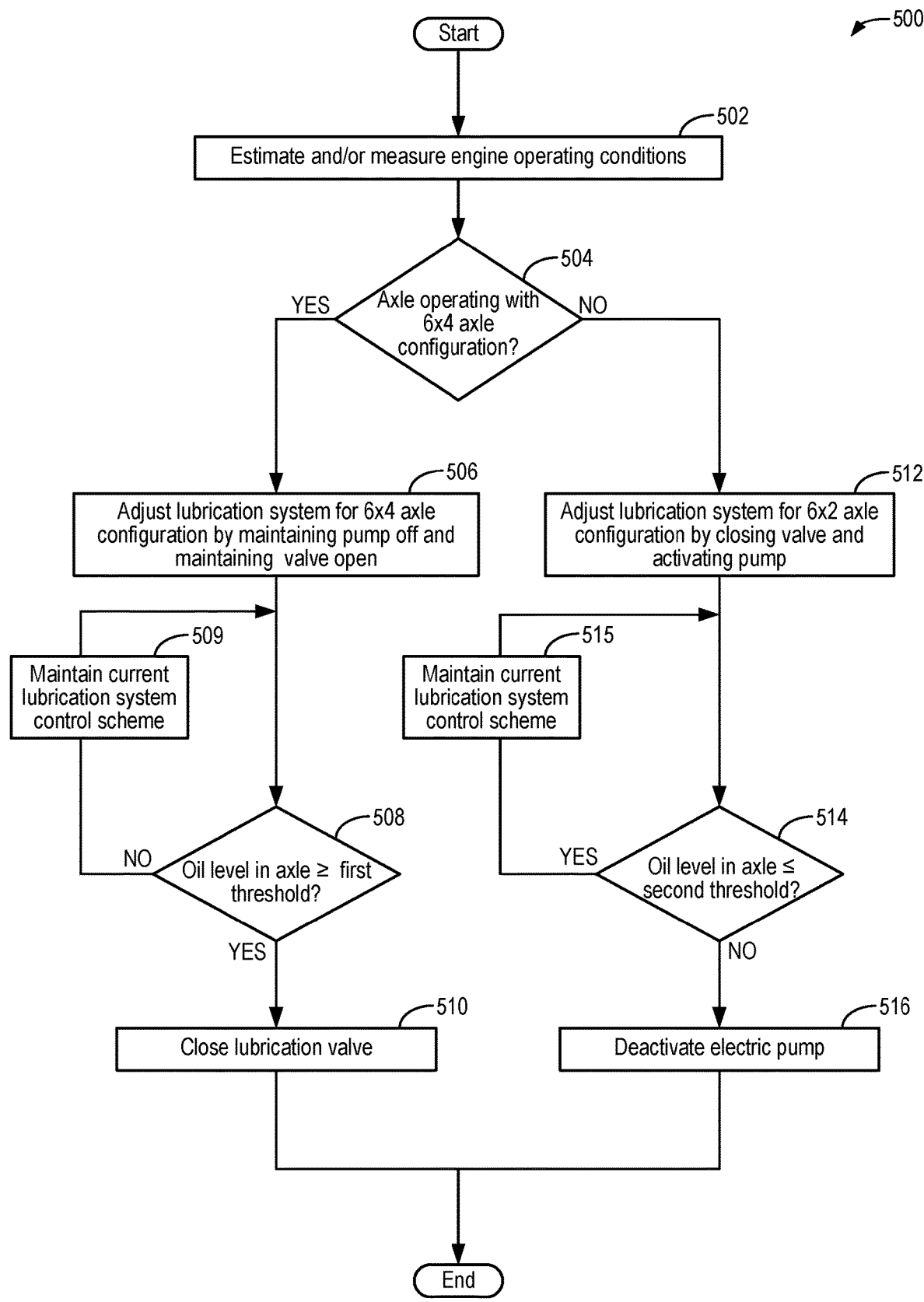
FIG. 5 shows an example method for adjusting a lubrication system for a tandem axle with disconnect based on an axle configuration of the tandem axle.
Figure 6:
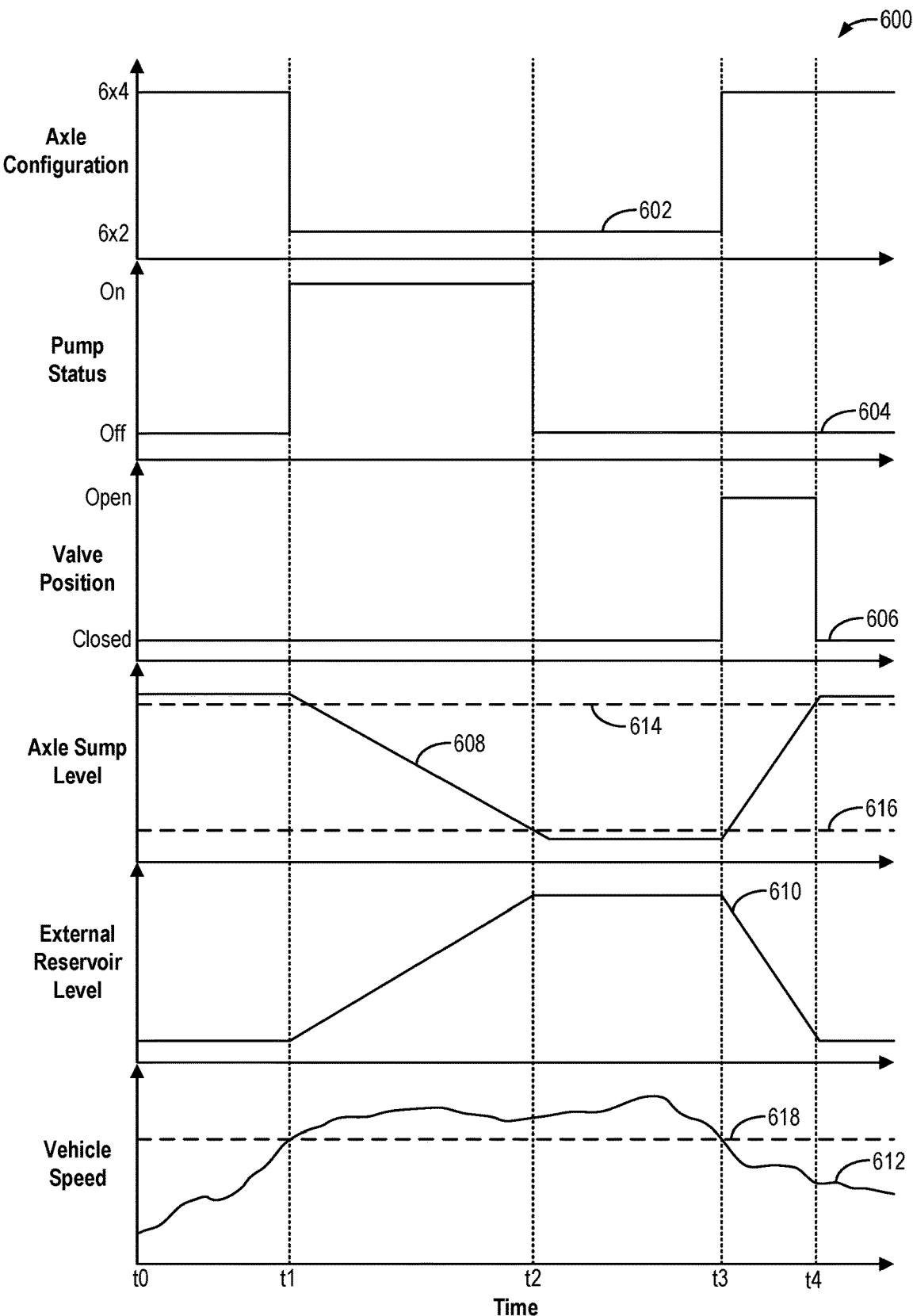
FIG. 6 shows a prophetic example timeline for operating a vehicle with a tandem axle with disconnect and a lubrication system for the tandem axle.

Next, FIG. 5 shows an example method 500 for operating an engine system to transition adjust an oil level in an axle sump based on an axle configuration of a tandem axle. For example, the tandem axle may have a disconnect feature, and as such, may operate in a first tandem axle configuration (e.g., a 6×4 axle configuration) and a second tandem axle configuration (e.g., a 6×2 axle configuration). In order to increase vehicle efficiency and decrease component wear, the adjustable lubrication system may be adjusted so that an oil level in the axle sump of the tandem axle is lower while operating with the 6×2 axle configuration, relative to the oil level in the axle sump while operating with the 6×4 axle configuration. Method 500 will be described with respect to the motor vehicle 106 shown in FIGS. 1 and 2 with the adjustable lubrication system 301 shown in FIG. 3, although method 500 may be applied in other systems that include a tandem axle with a disconnect feature and an adjustable lubrication system. Instructions for carrying out method 500 and the rest of the methods included herein may be executed by a controller based on instructions stored on a memory of the controller and in conjunction with signals received from sensors of the vehicle system, such as the sensors described with reference to FIG. 1. The controller may employ actuators of the vehicle system, such as an electric pump (e.g., electric pump 308 of FIG. 3 or electric pump 406 of FIGS. 4A and 4B) and a valve (e.g., valve 408 of FIGS. 4A and 4B) to adjust engine operation according to the methods described below.

At 502, method 500 includes estimating and/or measuring engine operating conditions. The operating conditions may include, for example, vehicle speed, engine speed, engine load, a tandem axle configuration (e.g., one of the first tandem axle configuration and the second tandem axle configuration), an axle sump level, and an external reservoir level. The operating conditions may be measured by one or more sensors communicatively coupled to the controller or may be inferred based on available data. For example, the axle sump level may describe a volume of oil in the axle sump, and the controller may determine the axle sump level based on a level sensor coupled to the axle sump. Further, the external reservoir level may describe a volume of lubricant (e.g., such as oil) in an external reservoir selectably coupled to the axle sump, and the controller may determine the external reservoir level based on a level sensor of the external reservoir. As another example, the controller may estimate the axle sump level based on the operating conditions such as oil temperature. For example, the controller may input an oil temperature, an oil age, a road grade, and an axle configuration into one or more look-up tables, maps, or functions, which may output an axle sump level.

At 504, method 500 includes determining whether the tandem axle is operating with the 6×4 axle configuration. For example, operating with the 6×4 axle configuration may include coupling both axles of the tandem axle to a driveshaft, such that each axle of the tandem axle (e.g., a front axle and a rear axle) are powered. For example, operating with the 6×4 axle configuration may provide additional traction for low speed operation. As another example, operating with the 6×4 axle configuration may provide additional traction in situations such as winter-weather driving and uphill driving, when additional traction may be desirable. As an example, the tandem axle may operate with the 6×4 axle configuration in response to a vehicle speed below a threshold vehicle speed. For example, the threshold vehicle speed may be a positive, non-zero speed below which operating with the 6×4 axle configuration is indicated, and above which operating with the 6×2 axle configuration is indicated.

If method 500 determines that the axle is operating with the 6×4 axle configuration at 504, method 500 continues to 506, and includes adjusting the adjustable lubrication system for operating with the 6×4 axle configuration by maintaining the electric pump off and maintaining the valve open. For example, while operating with the 6×4 axle configuration, additional oil in the axle sump may be indicated in order to increase component durability. For example, because both the forward axle and the rear axle are powered while operating with the 6×4 axle configuration, additional load may be placed on axle components. By providing additional oil, component degradation may be decreased while operating with the 6×4 axle configuration. Thus, the electric pump is maintained off, so that oil is not pumped from the axle sump to the external reservoir. Further, the valve is maintained open, so that additional engine oil may flow from the external reservoir to the axle sump through a return line. Specifically, when the valve is open, the return line fluidically couples the external reservoir to the axle sump, and a fluid pressure differential between the external reservoir and the axle sump causes oil to flow from the external reservoir to the axle sump. For example, the return line may be a gravity feed, so that oil flows from the external reservoir to the axle sump when the valve is open. As an example, a position of the valve is controlled via a solenoid, and the controller may adjust a control signal to the solenoid so that the valve remains open.

At 508, method 500 includes determining whether the oil level in the axle sump exceeds a first threshold oil level in the axle sump. For example, the first threshold oil level in the axle sump may be a positive, non-zero oil level above which no additional oil is indicated. For example, the first threshold oil level in the axle sump may be a pre-determined amount of oil in the axle sump for ideal operation with the 6×4 axle configuration. For example, when the axle sump level is below the first threshold oil level, additional oil from the external reservoir may be indicated, and when the axle sump level is at or above the first threshold oil level, no additional oil from the external reservoir may be indicated. In some examples, the controller may determine the oil level in the axle sump based on a signal from a level sensor coupled to the axle sump (e.g., such as level sensor 426 shown in FIG. 4), while in other examples, the oil level in the axle sump may be estimated by the controller based on engine operating conditions (e.g., such as oil temperature).

If, at 508, method 500 determines that the oil level in the axle sump does not exceed the first threshold oil level, method 500 continues to 509, and includes maintaining the current lubrication scheme. For example, the controller may maintain the lubrication system for the 6×4 axle configuration, such as by maintaining the pump off and maintaining the valve open. For example, if the controller determines that the oil level in the axle sump is less than the first threshold oil level, the controller may continue to maintain the valve in an open position so that oil may continue to flow from the external reservoir into the axle sump.

If method 500 determines, instead, that the oil level in the axle sump exceeds the first threshold oil level at 508, method 500 continues to 510, and includes closing the valve. For example, if the controller determines that the oil level in the axle sump is at or above the first threshold oil level, the controller may determine that no additional oil is indicated in the axle sump and as such, may close the valve. For example, closing the valve may prevent additional oil from flowing from the external reservoir to the axle sump. For example, the controller may adjust the control signal to the solenoid controlling the position of the valve so that the valve moves to a closed position, sealing the return line in order to prevent additional oil from flowing to the axle sump. As an example, after closing the valve, the tandem axle may continue to operate with the 6×4 axle configuration, with a relatively high oil level in the axle sump. Method 500 may then end.

If method 500 determines that the tandem axle is not operating with the 6×4 axle configuration at 504 (e.g., the tandem axle is operating with the 6×2 axle configuration), method 500 continues to 512 and includes adjusting the adjustable lubrication system for operating with the 6×2 axle configuration by closing the valve and activating the electric pump. For example, while operating with the 6×2 axle configuration, less oil in the axle sump may be indicated. As such, the controller may adjust the valve and the electric pump in order to decrease the oil level in the axle sump, leading to a corresponding increase in the oil level in the external reservoir. For example, by closing or maintaining closed the valve, the controller may prevent oil from flowing out of the external reservoir into the axle sump. As an example, the controller may adjust the control signal to the solenoid controlling the valve so that the valve closes. Further, the controller may activate the electric pump in order to pump oil out of the axle sump to the external reservoir.

At 514, method 500 includes determining whether the oil level in the axle sump is less than or equal to a second threshold oil level. For example, the second threshold oil level may be a positive, non-zero oil level ideal for axle operation with the 6×2 axle configuration. As an example, the second threshold oil level is less than the first threshold oil level, so that the amount of oil in the axle sump while operating with the 6×2 axle configuration is less than the oil level in the axle sump while operating with the 6×4 axle configuration. For example, while operating with the 6×2 axle configuration, the rear axle is disconnected from the driveshaft. As such, decreasing the amount of oil in the axle sump may increase efficiency without increasing component wear. As an example, the controller may determine whether the oil level in the axle sump is less than or equal to the second threshold oil level based on a level sensor in the axle sump. As another example, the controller may determine whether the oil level in the axle sump is less than or equal to the second threshold oil level based on a level sensor in the external reservoir.

If method 500 determines that the oil level in the axle sump is above the second threshold oil level at 514, method 500 continues to 515 and includes maintaining the current lubrication control scheme. For example, the controller may continue to operate the adjustable lubrication system for the 6×2 axle configuration. For example, the controller may continue to operate the electric pump, and may continue to maintain the valve closed. As such, the oil level in the axle sump may continue to decrease, and the oil level in the external reservoir may increase correspondingly.

If method 500 determines that the oil level in the axle sump is at or below the second threshold oil level at 514, method 500 continues to 516 and includes deactivating the electric pump. For example, when the oil level in the axle sump is at or below the second threshold oil level, the controller determines that removing additional oil from the axle sump is not indicated. As such, the controller may deactivate the electric pump so that no additional oil is pumped from the axle sump to the external reservoir. For example, the controller may adjust the control signal to the electric pump so that the pump deactivates. As an example, after deactivating the electric pump at 516, the tandem axle may continue to operate with the 6×2 axle configuration, and the lubrication system may be adjusted for operating with the 6×2 axle configuration (e.g., with a relatively low oil level in the axle sump). Method 500 may then end. In some examples, method 500 may run continuously during engine operation, so that the lubrication system may be adjusted based on an axle configuration of the tandem axle.

Further, in another embodiment, the lubrication system may not include a valve, and as such, oil may continuously drain from the external reservoir to the axle sump. In such an embodiment, the electric pump may periodically activate in order to maintain an oil level in the axle sump according to the axle configuration. In yet another embodiment, the valve may be an electric valve with multiple positions. For example, in a first position, the electric valve may slowly feed oil into the axle sump while operating with the 6×2 axle configuration in order to refresh oil in the axle sump. Further, in a second position, the electric valve may allow a larger portion of oil in the external reservoir to flow to the axle sump, such as during a hill climb or upon returning to operating with the 6×4 axle configuration. Therefore, multiple configurations of electric pumps and valves are envisioned without deviating from the scope of the present disclosure. Further, additional methods for adjusting a lubrication system of a tandem axle are envisioned, such as methods providing for refreshing oil in the axle sump, without deviating from the scope of the present disclosure.

In this way, an oil level in an axle sump of a tandem axle with a disconnect feature may be adjusted based on the selected axle configuration, which may increase efficiency while operating with the 6×2 axle configuration while reducing an incidence of component wear while operating with the 6×4 axle configuration. For example, components of the adjustable lubrication system, such as an electric pump and a valve, may be adjusted based on the axle configuration so that the oil level in the axle sump is higher while operating with the 6×4 axle configuration, relative to operating with the 6×2 axle configuration.

Next, FIG. 6 shows a prophetic example timeline for transitioning an engine between a first tandem axle configuration and a second tandem axle configuration. The engine may be engine 104 shown in FIGS. 1 and 2, for example, and controlled by controller 110 of FIGS. 1 and 2. Further, the engine may include a tandem axle with disconnect, such as tandem axle 172 of FIGS. 1 and 2, and a lubrication system, such as lubrication system 178 of FIGS. 1 and 2. For example, the tandem axle may transition between operating in a first tandem axle configuration (e.g., a 6×4 axle configuration) and a second tandem axle configuration (e.g., a 6×2 axle configuration), as described with respect to FIG. 2. Further, in response to the tandem axle transitioning between the 6×2 axle configuration and the 6×4 axle configuration, operation of the lubrication system may be adjusted, as elaborated above with respect to method 500 of FIG. 5. A tandem axle configuration is shown in plot 602, an electric pump status is shown in plot 604, a valve position is shown in plot 606, an axle sump level is shown in plot 608, an external reservoir level is shown in plot 610, and a vehicle speed is shown in plot 612. Further, a first threshold axle sump level is shown by dashed line 614, a second threshold axle sump level is shown by dashed line 616, and a threshold vehicle speed is shown by dashed line 618.

For all of the above, the horizontal axis represents time, with time increasing along the horizontal axis from left to right. The vertical axis represents each labeled parameter. For plots 608, 610, and 612, a magnitude of the parameter increases up the vertical axis from bottom to top. For plot 602, the vertical axis shows whether the tandem axle is operating with the 6×4 axle configuration ("6×4") or the 6×2 axle configuration ("6×2"). For plot 604, the vertical axis shows whether the electric pump is on ("On") or off ("Off"). Further, for plot 606, the vertical axis shows whether the valve is in an open position ("Open") or a closed position ("Closed").

Prior to time t1, the vehicle speed (plot 612) is below the threshold vehicle speed (dashed line 618), and as a result, the tandem axle operates in the 6×4 axle configuration (plot 602). In response, the lubrication system is adjusted for the 6×4 axle configuration. In particular, the electric pump is off (plot 604). Further, because the axle sump level (plot 608) is above the first threshold axle sump level (dashed line 614), the valve is maintained in a closed position (plot 606), so that no additional oil flows from the external reservoir to the axle sump. As a result, a large volume of oil remains in the axle sump, maintaining the axle sump level high (plot 608), while the amount of oil in the external reservoir remains at a low level (plot 610). For example, while operating with the 6×4 axle configuration, the high oil level in the axle sump may increase tandem axle efficiency, such as by reducing friction between components of the tandem axle.

At time t1, the vehicle speed (plot 612) increases above the threshold vehicle speed (dashed line 618). In response, the tandem axle transitions to operating with the 6×2 axle configuration (plot 602). For example, the threshold vehicle speed (dashed line 618) may be a speed at which the additional traction offered by the 6×4 axle configuration is not necessary, and at which vehicle efficiency may be increased by operating with the 6×2 axle configuration. In some examples, vehicle speed may be one of a plurality of factors in determining to transition between operating with the 6×4 axle configuration and the 6×2 axle configuration. Further, in some examples, the vehicle may transition between operating with the 6×4 axle configuration and the 6×2 axle configuration in response to a user input. Due to the tandem axle transitioning to the 6×2 axle configuration, the lubrication system is adjusted for the 6×2 axle configuration. For example, while operating with the 6×2 axle configuration, the tandem axle may operate with less oil in the axle sump. As such, the electric pump is turned on (plot 604) and the valve position remains closed (plot 606). For example, due to the operation of the electric pump, oil may be pumped from the axle sump to the external reservoir via the electric pump. Accordingly, the axle sump level begins to decrease (plot 608) and the external reservoir level begins to increase (plot 610). For example, decreasing the amount of oil in the axle sump may increase vehicle efficiency while operating with the 6×2 axle configuration.

Between time t1 and time t2, the vehicle speed (plot 612) remains above the threshold vehicle speed (dashed line 618), the tandem axle continues to operate with the 6×2 axle configuration (plot 602), and the electric pump remains on (plot 604). As a result, the axle sump level continues to decrease (plot 608) between time t1 and time t2, while the external reservoir level (plot 610) increases proportionally.

However, at time t2, the axle sump level (plot 608) decreases below the second threshold axle sump level (dashed line 616). In response, the electric pump turns off at time t2 (plot 604), so that no additional oil is pumped from the axle sump to the external reservoir level.

Between time t2 and time t3, the vehicle speed (plot 612) remains above the threshold vehicle speed (dashed line 618), so that that the tandem axle continues to operate in the 6×2 axle configuration (plot 602). However, because the pump is off (plot 604) between time t2 and time t3, the axle sump level (plot 608) remains roughly constant below the second threshold axle sump level (dashed line 616). Likewise, the external reservoir level (plot 610) remains constant between time t2 and time t3.

At time t3, the vehicle speed (plot 612) decreases below the threshold vehicle speed (dashed line 618). In response, the tandem axle transitions from operating with the 6×2 axle configuration to operating with the 6×4 axle configuration (plot 602) in order to provide additional traction, for example. As a result, the lubrication system adjusts for the 6×4 axle configuration, including maintaining the pump off (plot 604). Further, increase the axle sump level for operating with the 6×4 axle configuration, the valve position opens at time t3, so that oil flows from the external reservoir to the axle sump. Accordingly, between time t3 and time t4, the axle sump level (plot 608) increases, as the external reservoir level decreases.

At time t4, the axle sump level (plot 608) increases above the first threshold axle sump level (dashed line 614), while the tandem axle continues operating with the 6×4 axle configuration (plot 602). In response, the valve moves to a closed position (plot 606), so that the axle sump level (plot 608) remains constant after time t4.

In this way, a tandem axle with a disconnect feature may be operated with a first oil sump level while operating with the 6×2 axle configuration, and a second oil sump level while operating with the 6×4 axle configuration. Therefore, the tandem axle with an adjustable lubrication system may operate with increased efficiency in the 6×2 axle configuration, while reducing an incidence of component wear in the 6×4 axle configuration. For example, by providing an adjustable lubrication system with an external oil reservoir, an electric pump, and a drain line selectably coupling the external reservoir to the axle sump, an oil level in the axle sump may be adjusted based on the selected axle configuration. Therefore, the oil level in the axle sump may be decreased in the 6×2 axle configuration in order to increase vehicle efficiency, and the oil level in the axle sump may be increased in the 6×4 axle configuration in order to provide additional lubrication and reduce component wear. Overall, the vehicle may be provided with the benefits of the 6×2 axle configuration at high speeds and the benefits of the 6×4 axle configuration at low speeds, which may increase vehicle performance and customer satisfaction.

The technical effect of providing an adjustable lubrication system in a vehicle including a tandem axle with a disconnect feature is that vehicle efficiency may be increased while operating with a 6×2 axle configuration, and component wear may be reduced while operating with the 6×4 axle configuration. For example, an axle sump of the tandem axle with the disconnect feature may be provided with a first oil level while operating with the 6×2 axle configuration, and a second oil level while operating with the 6×4 axle configuration.

As an example, a method comprises: adjusting an oil level in an axle sump of a tandem axle based on an axle configuration of the tandem axle, the axle sump selectably coupled to an external reservoir via a first oil passage and a second oil passage, the first oil passage including an electric pump, the second oil passage including a valve, and the tandem axle coupled to a drivetrain of a motor vehicle. In the preceding example, additionally or optionally, while the tandem axle operates with a first axle configuration, a drive shaft of an engine provides torque to a first axle and a second axle, each of the first axle and the second axle coupled to at least two wheels; and while the tandem axle operates with a second axle configuration, the drive shaft of the engine provides torque to the first axle and does not provide torque to the second axle. In one or both of the preceding examples, additionally or optionally, adjusting the oil level in the axle sump of the tandem axle based on an axle configuration of the tandem axle includes: responsive to the tandem axle transitioning from operating with the first axle configuration to operating with the second axle configuration, flowing oil from the axle sump to the external reservoir through the first oil passage by activating the electric pump, and blocking flow through the second oil passage by closing the valve; and responsive to the oil level in the axle sump at or below a first threshold oil level while the tandem axle operates with the second axle configuration, blocking flow through the first oil passage by deactivating the electric pump. In any or all of the preceding examples, additionally or optionally, adjusting the oil level in the axle sump of the tandem axle further includes: responsive to the tandem axle transitioning from operating with the second axle configuration to operating with the first axle configuration, flowing oil from the external reservoir to the axle sump through the second oil passage by opening the valve; and responsive to the oil level in the axle sump at or above a second threshold oil level while the tandem axle operates with the first axle configuration, blocking flow through the second oil passage by closing the valve. In any or all of the preceding examples, additionally or optionally, the first threshold oil level is lower than the second threshold oil level. In any or all of the preceding examples, additionally or optionally, the tandem axle transitions from the first axle configuration to the second axle configuration responsive to at least one of a vehicle speed above a threshold vehicle speed, a user input, and a road condition, and the tandem axle transitions from the second axle configuration to the first axle configuration responsive to at least one of a vehicle speed below the threshold vehicle speed, the user input, and the road condition. In any or all of the preceding examples, additionally or optionally, the second oil passage is a gravity feed. In any or all of the preceding examples, additionally or optionally, the oil level in the axle sump is determined based on a signal from a level sensor, the level sensor coupled to the axle sump.

As another example, a method comprises: responsive a tandem axle transitioning from a 6×4 axle configuration to a 6×2 axle configuration, adjusting an oil level in an axle sump of the tandem axle to a first threshold level, the axle sump of the tandem axle selectably coupled to an external reservoir; and responsive to the tandem axle transitioning from the 6×2 axle configuration to the 6×4 axle configuration, adjusting the oil level in the axle sump of the tandem axle to a second threshold level, the second threshold level higher than the first threshold level. In the preceding example, additionally or optionally, the tandem axle is coupled to a drive shaft of a motor vehicle, the drive shaft providing torque to a first axle while operating with the 6×2 axle configuration, and the drive shaft providing torque to each of the first axle and a second axle while operating with the 6×4 axle configuration. In one or both of the preceding examples, additionally or optionally, the axle sump is selectably coupled to the external reservoir via a first oil passage and a second oil passage, the first oil passage including an electric pump, and the second oil passage including a valve, the valve actuatable between an open position and a closed position. In any or all of the preceding examples, additionally or optionally, when activated, the electric pump flows oil from the axle sump to the external reservoir through the first oil passage and, when not activated, the electric pump does not flow oil from the axle sump to the external reservoir through the first oil passage. In any or all of the preceding examples, additionally or optionally, adjusting the oil level in the axle sump of the tandem axle to the first threshold level includes: responsive to the oil level in the axle sump above the first threshold level, flowing oil from the axle sump to the external reservoir through the first oil passage by activating the electric pump; blocking oil from flowing from the external reservoir to the axle sump through the second oil passage by closing the valve; and responsive to the oil level in the axle sump at or below the first threshold level, deactivating the electric pump. In any or all of the preceding examples, additionally or optionally, adjusting the oil level in the axle sump of the tandem axle to the second threshold level includes: responsive to the oil level in the axle sump below the second threshold level, flowing oil from the external reservoir to the axle sump through the second oil passage by opening the valve; and responsive to the oil level in the axle sump at or above the second threshold level, closing the valve. In any or all of the preceding examples, additionally or optionally, the oil level is determined based on a signal from a level sensor coupled to the axle sump.

As yet another example, a system comprises: a tandem axle, the tandem axle coupled to a powertrain of a motor vehicle; an axle sump fluidically coupled to the tandem axle; an external reservoir; a first oil passage selectably coupling the external reservoir to the axle sump via an electric pump; a second oil passage selectably coupling the external reservoir to the axle sump via a valve; and a controller including instructions stored in non-transitory memory that, when executed, cause the controller to: adjust an oil level in the axle sump based on an axle configuration of the tandem axle, the oil level adjusted differently while operating with a first axle configuration relative to operating with a second axle configuration. In the preceding example, additionally or optionally, the tandem axle transitions from the first axle configuration to the second axle configuration in response to a vehicle speed exceeding a threshold vehicle speed, and the tandem axle transitions from the second axle configuration to the first axle configuration in response to the vehicle speed below the threshold vehicle speed. In one or both of the preceding examples, additionally or optionally, the first axle configuration includes providing torque to each of a first axle and a second axle, and the second axle configuration includes providing torque to a first axle while not providing torque to the second axle. In any or all of the preceding examples, additionally or optionally, to adjust the oil level in the axle sump based on the axle configuration of the tandem axle, the controller includes further instructions stored in non-transitory memory that, when executed, cause the controller to: responsive to the tandem axle transitioning from the first axle configuration to the second axle configuration, flowing oil from the axle sump to the external reservoir through the first oil passage by activating the electric pump; and responsive to the tandem axle transitioning from the second axle configuration to the first axle configuration, flowing oil from the external reservoir to the axle sump through the second oil passage by opening the valve. In any or all of the preceding examples, additionally or optionally, the oil level in the axle sump is determined based off at least one of a signal from a level sensor coupled to the axle sump, an oil temperature, an oil age, and a road gradient (e.g., grade).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle system, comprising:
   operating an electric valve in a first position that feeds oil into an axle sump through a second oil passage at a lower rate while a tandem axle operates under a first condition, wherein the second oil passage fluidly connects the axle sump and an external reservoir; and
   operating the electric valve in a second position that feeds oil into the axle sump through the second oil passage at a higher rate while the tandem axle operates under a second condition;
   wherein the vehicle system includes a first oil passage with a pump coupled thereto and fluidly coupled to the axle sump and the external reservoir.

2. The method of claim 1, further comprising activating the pump while the tandem axle operates under the first condition.

3. The method of claim 2, further comprising deactivating the pump while the tandem axle operates under the second condition.

4. The method of claim 1, wherein the first condition is a condition in which a drive shaft provides torque to a first axle and does not provide torque to a second axle in the tandem axle.

5. The method of claim 4, wherein the second condition is a condition in which the drive shaft provides torque to the first axle and the second axle.

6. The method of claim 1, wherein the second condition is a hill climb condition where the tandem axle is on a gradient that surpasses a threshold value.

7. A vehicle system, comprising:
   a tandem axle coupled to a drive shaft and including a first axle and a second axle;
   an axle sump fluidically coupled to the tandem axle;
   an external reservoir;
   a first oil passage selectably coupling the external reservoir to the axle sump via an electric pump;
   a second oil passage selectably coupling the external reservoir to the axle sump via an electric valve; and
   a controller including instructions stored in non-transitory memory that, when executed, cause the controller to:
     decrease an oil level in the axle sump in response to the tandem axle transitioning from a first configuration to a second configuration;
     wherein, in the first configuration, the drive shaft provides torque to the first axle and the second axle; and
     wherein, in the second configuration, the drive shaft provides torque to the first axle and does not provide torque to the second axle.

8. The vehicle system of claim 7, wherein the controller further comprises instructions stored in the non-transitory memory that, when executed, cause the controller to:
   increase the oil level in the axle sump in response to the tandem axle transitioning from the second configuration to the first configuration.

9. The vehicle system of claim 7, wherein the tandem axle is spaced away from a steering axle.

10. The vehicle system of claim 7, wherein the drive shaft is rotationally coupled to a transmission.

11. The vehicle system of claim 10, wherein the transmission is rotationally coupled to an internal combustion engine.

12. The vehicle system of claim 7, further comprising an oil level sensor coupled to the axle sump and wherein the controller further comprises instructions stored in the non-transitory memory that, when executed prior to decreasing the oil level, cause the controller to:
   determine the oil level in the axle sump.

13. A method for operation of a vehicle system, comprising:
   periodically activating an oil pump that directs oil from an axle sump to an external reservoir based on an axle configuration of a tandem axle, wherein the external reservoir is configured to continuously drain oil into the axle sump;

wherein the oil pump is activated more frequently while the tandem axle operates in a first configuration where a drive shaft provides torque to a first axle and does not provide torque to a second axle; and wherein the oil pump is activated less frequently while the tandem axle operates in a second configuration where the drive shaft provides torque to the first axle and the second axle.

14. The method of claim 13, wherein the tandem axle is spaced away from a steering axle.

15. The method of claim 13, wherein the drive shaft is an engine drive shaft.

\* \* \* \* \*